(12) United States Patent
Ashwood-Smith (10) Patent No.: US 8,874,709 B2
(45) Date of Patent: Oct. 28, 2014

(54) AUTOMATIC SUBNET CREATION IN NETWORKS THAT SUPPORT DYNAMIC ETHERNET-LOCAL AREA NETWORK SERVICES FOR USE BY OPERATION, ADMINISTRATION, AND MAINTENANCE

(75) Inventor: Peter Ashwood-Smith, Gatineau (CA)

(73) Assignee: Futurewei Technologies, Inc., Plano, TX (US)

( * ) Notice: Subject to any disclaimer, the term of this patent is extended or adjusted under 35 U.S.C. 154(b) by 692 days.

(21) Appl. No.: 12/766,653

(22) Filed: Apr. 23, 2010

(65) Prior Publication Data

US 2010/0281106 A1 Nov. 4, 2010

Related U.S. Application Data

(60) Provisional application No. 61/174,883, filed on May 1, 2009.

(51) Int. Cl.
*G06F 15/173* (2006.01)
*H04L 12/28* (2006.01)
*H04L 12/24* (2006.01)
*H04L 12/46* (2006.01)

(52) U.S. Cl.
CPC ............ *H04L 41/26* (2013.01); *H04L 12/2852* (2013.01); *H04L 12/462* (2013.01)
USPC ............................ 709/223; 709/203; 370/230

(58) Field of Classification Search
CPC ....................................................... H04L 41/00
USPC .......................................... 709/203; 370/230
See application file for complete search history.

(56) References Cited

U.S. PATENT DOCUMENTS

| 6,789,104 | B1 * | 9/2004 | Yamaguchi et al. | 709/203 |
| 7,043,541 | B1 | 5/2006 | Bechtolsheim et al. | |
| 7,606,203 | B1 * | 10/2009 | Shabtay et al. | 370/332 |
| 2002/0123365 | A1 * | 9/2002 | Thorson et al. | 455/524 |
| 2004/0215758 | A1 * | 10/2004 | Kompella et al. | 709/223 |
| 2007/0263535 | A1 * | 11/2007 | Shabtay | 370/230 |
| 2008/0107027 | A1 * | 5/2008 | Allan et al. | 370/235 |
| 2008/0151780 | A1 | 6/2008 | Suhail et al. | |

(Continued)

OTHER PUBLICATIONS

Don Fedyk; 802.1aq Shortest Path Bridging Recap; Jan. 13, 2009; January Interim New Orleans; pp. 1-36.*

(Continued)

*Primary Examiner* — Glenford Madamba
(74) *Attorney, Agent, or Firm* — Conley Rose, P.C.; Grant Rodolph; William H. Dietrich (57) ABSTRACT

A system comprising a plurality of nodes coupled to each other and configured to join a logical, dynamically created Ethernet-Local Area Network (E-LAN) service, and an operations, administration, and maintenance (OA&M) server coupled to a first node of the nodes via a port, wherein the nodes and the OA&M server exchange OA&M traffic over the E-LAN service. Also disclosed is a network component comprising at least one processor configured to implement a method comprising advertising an E-LAN service identifier (SID) for an OA&M logical or physical port on an E-LAN, joining an E-LAN service that corresponds to the SID, and receiving an OA&M Internet Protocol (IP) address assigned for OA&M communications over the E-LAN service. Also disclosed is a method comprising establishing a default E-LAN service for an OA&M network, and exchanging OA&M communications with the OA&M network over the E-LAN service.

18 Claims, 6 Drawing Sheets

(56) References Cited

U.S. PATENT DOCUMENTS

| | | | |
|---|---|---|---|
| 2008/0219268 A1* | 9/2008 | Dennison | 370/395.2 |
| 2009/0175176 A1* | 7/2009 | Mohan | 370/244 |
| 2011/0019678 A1* | 1/2011 | Mehta et al. | 370/401 |

OTHER PUBLICATIONS

Allan, D., et al., "Provider Link State Bridging", Communications Magazine, IEEE vol. 46, Issue 9, Sep. 2008 pp. 110-117.

Ashwood-Smith, Peter, et al.,"New Innovations in Ethernet: Provider Link State Bridging," Nortel Technical Journal, 2008: //www.nortel.com/corporate/news/collateral/ntj6_plsb.pdf.

Fedyk, Don et al., "Provider Link State Bridging (PLSB)," //www.ieee802.org/1/files/public/docs2007/aq-fedyk-provider-link-state-bridging-0107-01.pdf, 2009.

"IEEE Standard for Local and Metropolitan Area Networks—Virtual Bridged Local Area Networks," IEEE Standard 802.1Q™-2005, May 19, 2006.

"Draft Standard for Local and Metropolitan Area Networks—Virtual Bridged Local Area Networks—Amendment 9: Shortest Path Bridging," P802.1aq/D1.5, Dec. 17, 2008.

Perlman, R., et al., "Rbridges: Base Protocol Specification," draft-ietf-trill-rbridge-protocol-14.txt, Oct. 26, 2009.

Foreign Communication From a Related Counterpart Application, PCT Application PCT/CN2010/072279, International Search Report dated Aug. 5, 2010, 5 pages.

Foreign Communication From a Related Counterpart Application, PCT Application PCT/CN2010/072279, Written Opinion dated Aug. 5, 2010, 8 pages.

ITU-T, "Series Y: Global Information Infrastructure, Internet Protocol Aspects and Next-Generation Networks, Internet Protocol Aspects—Operation, Administration and Maintenance—OAM Functions and Mechanisms for Ethernet Based Networks," Telecommunication Standardization Sector of ITU, Y.1731, Feb. 2008, 82 pages.

"IEEE Standard for Local and Metropolitan Area Networks—Virtual Bridged Local Area Networks—Amendment 5: Connectivity Fault Management," IEEE Computer Society, 802.1ag, 2007, 260 pages.

* cited by examiner

AUTOMATIC SUBNET CREATION IN NETWORKS THAT SUPPORT DYNAMIC ETHERNET-LOCAL AREA NETWORK SERVICES FOR USE BY OPERATION, ADMINISTRATION, AND MAINTENANCE

CROSS-REFERENCE TO RELATED APPLICATIONS

The present application claims priority to U.S. Provisional Patent Application No. 61/174,883, filed May 1, 2009 by Peter Ashwood-Smith et al., and entitled "System and Method for Automatic Subnet Creation in Networks Supporting Dynamic Ethernet-LAN Services," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames from one node to another node across the network without using pre-configured routes on intermediate nodes. Other networks may forward the data frames from one node to another node across the network along pre-configured or pre-established paths. In some networks, the nodes may create Ethernet-Local Area Network (E-LAN) services, where traffic that corresponds to different services may be transported along different sub-networks, e.g. by different subsets of nodes. For example, the E-LAN services may comprise Institute of Electrical and Electronics Engineers (IEEE) 802.1aq network services or Virtual Private LAN Services (VPLS).

SUMMARY

In one embodiment, the disclosure includes a system comprising a plurality of nodes coupled to each other and configured to join a logical, dynamically created E-LAN service, and an operations, administration, and maintenance (OA&M) server coupled to a first node of the nodes via a port, wherein the nodes and the OA&M server exchange OA&M traffic over the E-LAN service.

In another embodiment, the disclosure includes a network component comprising at least one processor configured to implement a method comprising advertising an E-LAN service identifier (SID) for an OA&M logical or physical port on an E-LAN, joining an E-LAN service that corresponds to the SID, and receiving an OA&M Internet Protocol (IP) address assigned for OA&M communications over the E-LAN service.

In a third embodiment, the disclosure includes a method comprising establishing a default E-LAN service for an OA&M network, and exchanging OA&M communications with the OA&M network over the E-LAN service.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

OA&M services for nodes or other network components may be implemented using network protocols, such as Transmission Control Protocol (TCP)/IP. The TCP/IP protocols, such as Simple Network Management Protocol (SNMP)/Command Line Interface (CLI), may use the IP addresses assigned to the nodes to handle OA&M services. Accordingly, each OA&M port may be configured by an assigned IP address and coupled to an OA&M-only network, e.g. not via the network used to transport data packets. However, connecting each OA&M port directly to the OA&M-only network may increase cost and manual labor, which may not be desirable or practical. Alternatively, the nodes may be configured to route the OA&M IP addresses without connecting the ports directly to an OA&M network. As such, the switches may require additional IP routing functionality, e.g. above the link layer (Open Systems Interconnection (OSI) Layer 2) or the Ethernet layer, to handle the OA&M services.

Disclosed herein is an alternative system and method for providing OA&M services in a network using a plurality of nodes that may be configured to establish or join logical, dynamically created E-LAN services (e.g. 802.1aq network services or VPLS) in a dynamic manner. Accordingly, the nodes may be configured to join a default E-LAN service to establish an OA&M sub-network, e.g. automatically when a link to an OA&M network is detected by one of the nodes. The E-LAN service may be used to acquire the nodes' IP addresses and hence exchange OA&M communications. Such an E-LAN based OA&M sub-network may support OA&M communications and services, e.g. at the link layer, without the need to directly connect the nodes' ports to the OA&M network or to add an OA&M IP address routing functionality to the nodes.

Figure 1:
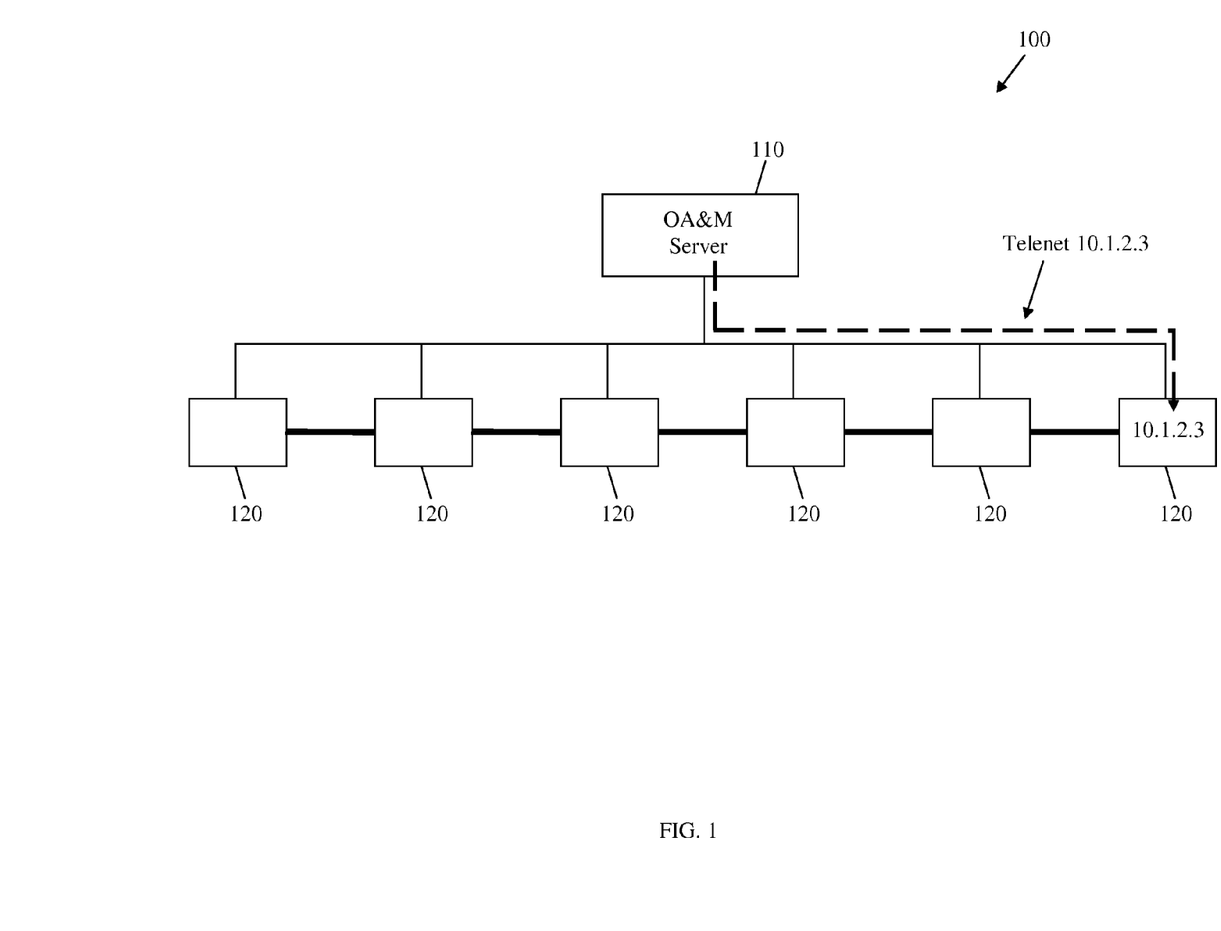
FIG. 1 is a schematic diagram of an embodiment of an OA&M sub-network.

FIG. 1 illustrates an embodiment of an OA&M-only sub-network 100 that comprises a plurality of coupled nodes. The OA&M-only sub-network 100 may comprise an OA&M server 110 and a plurality of nodes 120 coupled to the OA&M server 110. The OA&M server 110 may be located in an OA&M network (not shown) and may handle the OA&M functions and services for the nodes 120. The nodes 120 may comprise switches, routers, bridges, or combinations thereof, which may each comprise a plurality of logical and/or physical ports, and may be coupled to each other via the ports and a plurality of network links. The nodes 120 may also be located in a network (not shown), which may comprise the OA&M-only sub-network 100.

To establish the OA&M-only sub-network 100, each of the nodes 120 may be coupled to the OA&M server 110, e.g. via a corresponding logical and/or physical port and a dedicated OA&M link. As such, the OA&M server 110 may communicate with the individual nodes 120 using individual IP addresses assigned to the nodes 120 and TCP/IP protocols, e.g. Telenet and/or Hypertext Transfer Protocol (HTTP). For example, the OA&M may communicate with a node 120 via a Telenet session using the IP address (e.g. 10.1.2.3). The couplings between the nodes 120 and the OA&M server 110 may require additional setup (e.g. network configuration, links, equipments, etc.) on behalf of the operator of the network. Thus, the OA&M-only sub-network 100 may not be practical to implement outside a laboratory environment, such as in actual scale deployment.

Figure 2:
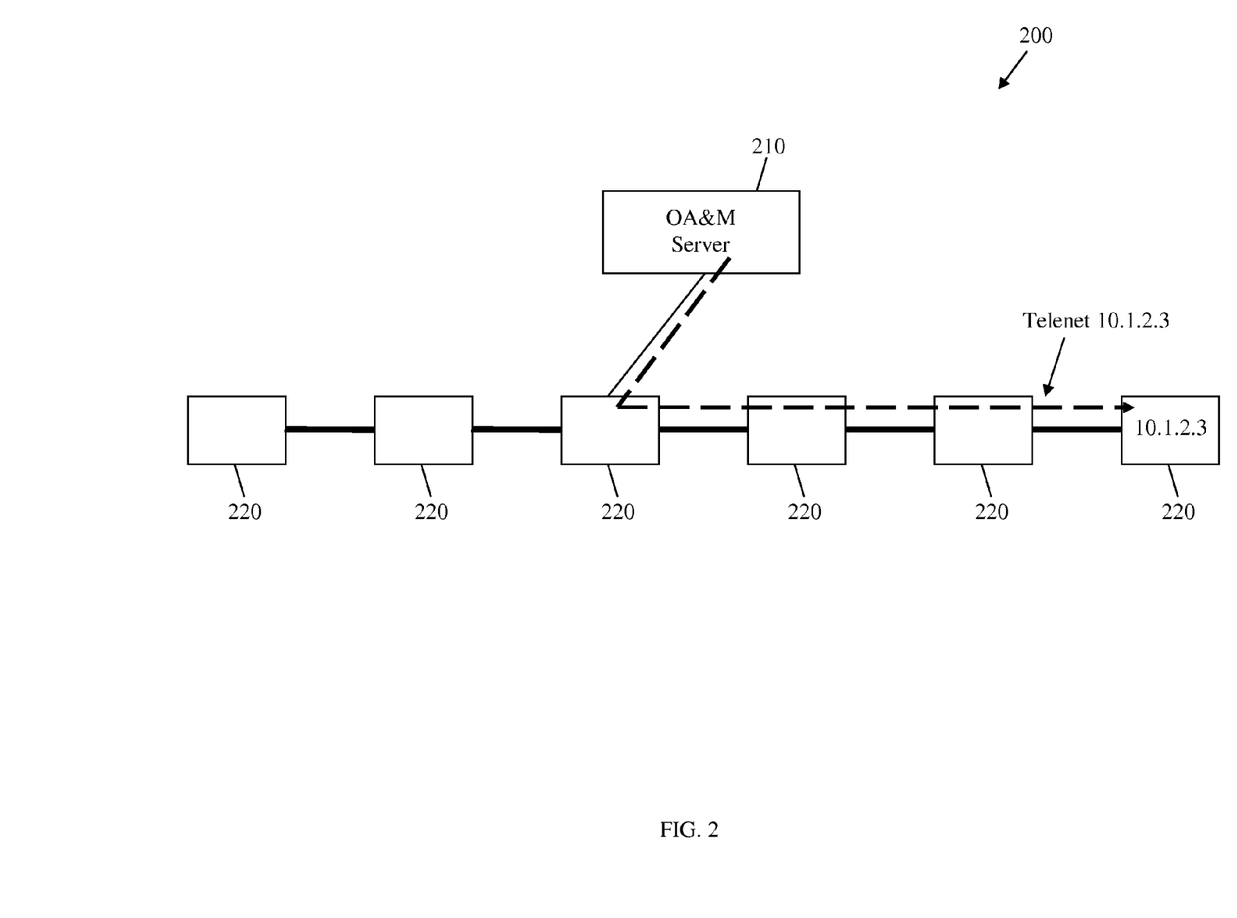
FIG. 2 is a schematic diagram of another embodiment of an OA&M sub-network.

FIG. 2 illustrates an embodiment of another OA&M sub-network 200 that comprises a plurality of IP address based routers. The OA&M sub-network 200 may comprise an OA&M server 210 and a plurality of nodes 220 coupled to the OA&M server 210. The OA&M server 210 may be substantially similar to the OA&M server 110. The nodes 220 may comprise switches, routers, bridges, or combinations thereof, which may each comprise a plurality of ports, and may be coupled to each other via the ports and a plurality of network links. The nodes 220 may be located in a network (not shown), which may comprise the OA&M sub-network 200. The nodes 220 may be configured to route data packets between each other. The nodes 220 may also be configured to route OA&M communications between the OA&M server 210 and each other based on the IP addresses of the OA&M associated ports. The nodes 220 may provide IP address routing to the OA&M ports without directly connecting each of the ports to the OA&M server 210 or adding extra connections between the nodes 220. However, the nodes 220 may need additional IP functionality and/or protocols to route the OA&M IP addresses, which may add system cost or may not be feasible.

Figure 3:
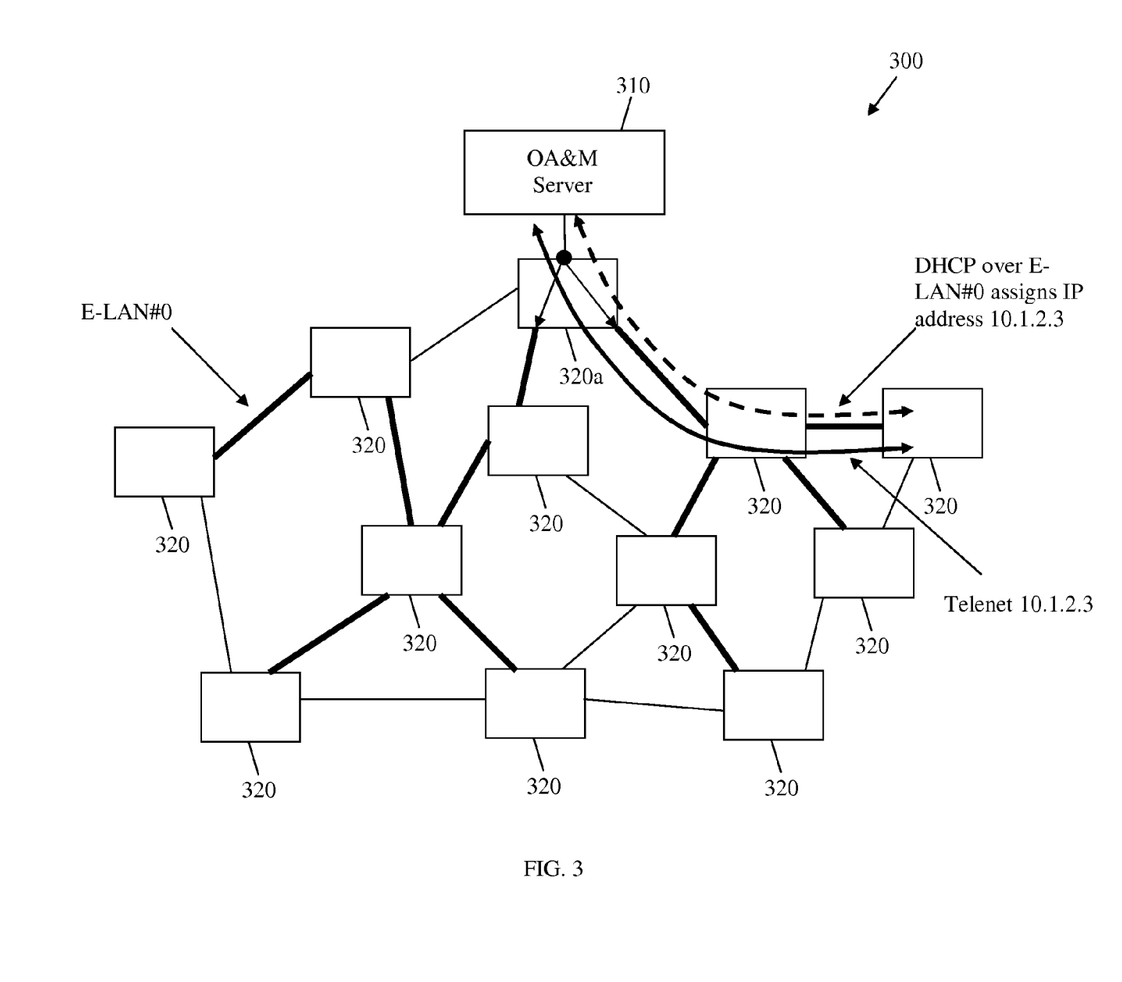
FIG. 3 is a schematic diagram of an embodiment of an E-LAN service over an OA&M sub-network.

FIG. 3 illustrates an embodiment of another OA&M sub-network 300 that comprises a plurality of nodes. The OA&M sub-network 300 may comprise an OA&M server 310 and a plurality of nodes 320 coupled to the OA&M server 310. The nodes 320 may comprise switches, routers, bridges, or combinations thereof that are coupled to each other in a network that may comprise the OA&M sub-network 300. The OA&M server 310 may be substantially similar to the OA&M 110. The nodes 320 may be configured to establish logical Ethernet services, e.g. via a plurality of links/paths between the nodes 320. For instance, the nodes 320 may dynamically create and join E-LAN services in the network, such as 802.1aq services, 802.1ad services, multi-protocol label switching (MPLS), VPLS, TRansparent Interconnection of Lots of Links (TRILL) as defined by Internet Engineering Task Force (IETF) document draft-ietf-trill-rbridge-protocol-14 (which is incorporated herein by reference), or other E-LAN services. Further, the nodes 320 may join one of the E-LAN services to establish the OA&M sub-network 300 with the OA&M server 310. The E-LAN service may be automatically created between the nodes 320 and the OA&M server 310 without operator intervention, e.g. when one of the nodes 320 detects a link with the OA&M server 310. Hence, the nodes 320 may use the E-LAN service to provide a logical IP subnet between the nodes 320 and the OA&M server 310.

For instance, the nodes 320 may be coupled to each other, e.g. in a mesh topology, and may comprise a node 320a that may be directly coupled via one of its ports to the OA&M server 320, as indicated by the solid circle in FIG. 3. After detecting the connection between the node 320a and the OA&M server 320, the nodes 320 may join an E-LAN service and establish a logical Ethernet sub-network that is coupled to the OA&M server 310. For example, each of the nodes 320 may use an 802.1aq service or a similar service to establish the logical Ethernet sub-network with the other nodes 320 and the OA&M server 310. In FIG. 3, the E-LAN service, e.g. E-LAN#0, is indicated by the bold solid lines between the nodes 320. The E-LAN service may be bridged to an internal OA&M control stack in the OA&M server 310 or the associated OA&M network via the port of the node 320a that is coupled to the OA&M server 310.

After joining the E-LAN service, the nodes 320 may acquire IP addresses for the OA&M E-LAN service, for instance using Dynamic Host Configuration Protocol (DHCP) or a similar protocol. The IP addresses may be used to route the OA&M communications between the OA&M server 310 and the nodes 320. For example, after creating and joining the E-LAN#0, the nodes 320 may send DHCP requests over the E-LAN#0 to the OA&M network. Thus, the OA&M server 320 may return the assigned IP addresses to the nodes 320, which may be used subsequently to implement TCP/IP operations such as initiating Telenet/HTTP protocol sessions. In FIG. 3, the dashed, double-headed arrow represents a DHCP exchange over the E-LAN#0 between the nodes 320a and the OA&M server 310 to request and assign an IP address, e.g. 10.1.2.3, for the node 320a. The solid, double-headed arrow represents a Telenet session that may be established between the OA&M server 310 and the node 320a to route traffic using the IP address 10.1.2.3.

In an embodiment, at least one default E-LAN service (e.g. E-LAN#0, E-LAN#1, and/or E-LAN#FF) may be reserved for OA&M communications for the nodes 320. The default E-LAN service may be identified using a default or reserved E-LAN service identification number, such as a SID, for OA&M service (e.g. SID#0, SID#1, and/or SID#FF). The SID for OA&M service may be provided to the nodes 320 prior to deployment, e.g. similar to default Media Access Control (MAC) addresses that may be provided by a manufacturer of the nodes. As such, the nodes may join the default E-LAN service to create the OA&M sub-network and the IP addresses may be assigned to allow IP routing and OA&M communications without operator intervention.

Using the E-LAN service to provide OA&M traffic routing for the nodes 320 may be advantageous over other OA&M networking schemes, such as for the OA&M sub-network 100 and the OA&M sub-network 200. Specifically, the OA&M E-LAN service may be established using existing network links without directly connecting a port of each node 320 to the OA&M server 310. Further, the OA&M E-LAN service may be established at the network layer 2, e.g. using Ethernet switches/routers in a Metro Ethernet or Carrier Ethernet deployment, without adding additional IP routing functionality or protocols to the nodes 320. The OA&M E-LAN service may also be repaired, e.g. in a dynamic manner, using standard E-LAN service repair techniques. Additionally, a Service Level Agreement (SLA) and/or Quality of Service (QoS) may be enforced on the OA&M E-LAN service, e.g. to improve OA&M in the network.

Figure 4:
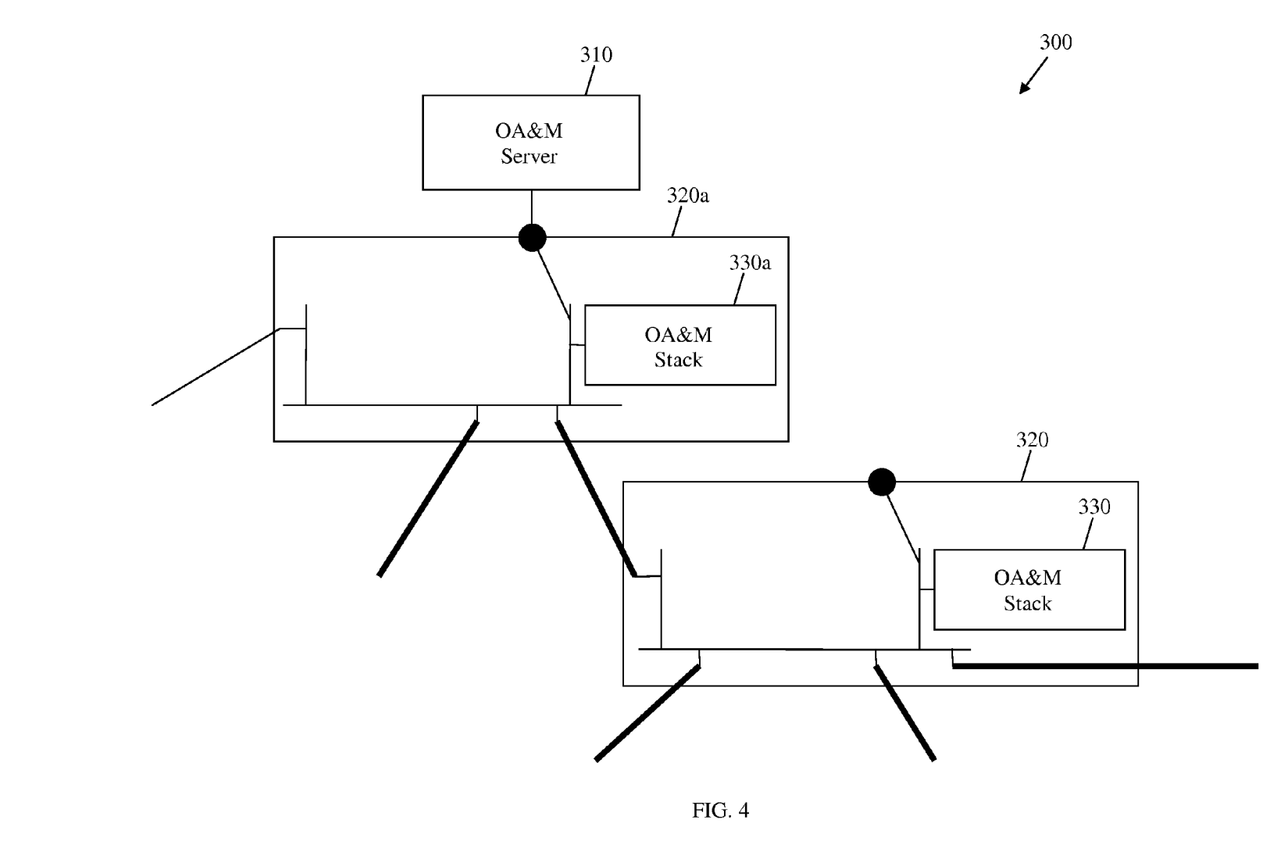
FIG. 4 is a schematic diagram of an embodiment of OA&M port connections.

FIG. 4 illustrates an embodiment of OA&M port connections in the OA&M sub-network 300. The OA&M server 310 may be directly coupled to an OA&M port of one of the nodes 320, e.g. the node 320a. The OA&M port may be associated with an OA&M function or stack 330, 330a in the nodes 320, 320a, respectively. The OA&M port may be assigned an IP address in the OA&M sub-network 300 and may forward OA&M traffic between the OA&M server 310 and the OA&M stack 330. The OA&M stack 330 may handle the OA&M operations in the node 320a, which may be coupled to the remaining nodes 320 in the OA&M sub-network 300, e.g. in a tree-like topology that does not have any loops. For instance, the OA&M stack 330a in the node 320a may be coupled to at least a second OA&M stack 330 in a second node 320. Further, the OA&M stack 330a may be coupled to a second OA&M port of the second node 320 via a logical E-LAN in the second node 320. Similarly, each of the nodes 320 in the OA&M sub-network 300 may be coupled to at least one second node 320 via a logical E-LAN in the second node 320. As such, the OA&M stacks 330 in the nodes 320 may forward or relay OA&M traffic between the neighboring nodes 320 and the OA&M server 310, e.g. over a default E-LAN service. The traffic may be routed between the nodes 320 based on the IP addresses assigned to the OA&M ports of the nodes 320. In FIG. 4, the OA&M ports in the nodes 320 are indicated by the solid circles and the default E-LAN service for the nodes 320, e.g. E-LAN#0, is indicated by the bold solid lines between the nodes 320.

In embodiment, the nodes 320 may implement the 802.1aq protocol to join the default E-LAN service and hence establish an OA&M sub-network, such as the nodes 320 in the OA&M sub-network 300. The 802.1aq protocol may be suitable to create a substantially high quantity of logical E-LANs, e.g. tens, hundreds, or thousands of logical E-LANs, and thus may support a substantially large number of nodes 320 in the OA&M sub-network. Accordingly, the nodes 320 may use an 802.ah (MAC-in-MAC) path to transport OA&M traffic that corresponds to the OA&M E-LAN service. In another embodiment, the nodes 320 may use other E-LAN services to establish the OA&M sub-network, such as in VPLS systems. However, in VPLS systems, additional steps may be needed to establish the OA&M E-LAN service.

In another embodiment, the nodes 320 may connect to the OA&M server or a component of the OA&M network via 802.1aq Network-to-Network interfaces (NNIs). As such, each node 320 may use a corresponding 802.1aq NNI to connect directly to an 802.1aq NNI of the OA&M network. Thus, the nodes 320 may advertise their E-LAN SID to the OA&M network over the 802.1aq NNIs. The 802.1aq NNI connections may allow the OA&M server 310 or network to obtain the network topology of the nodes 320 and any associated events.

Figure 5:
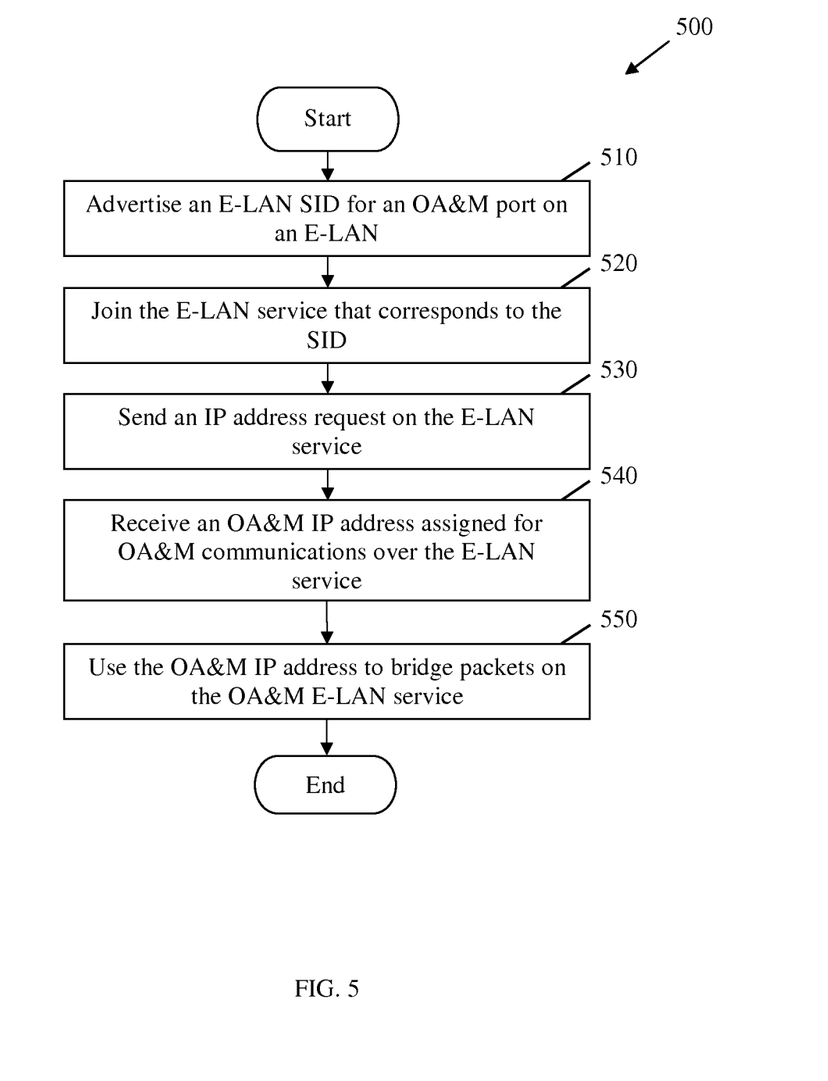
FIG. 5 is a flowchart of an embodiment of an OA&M E-LAN service configuration method.

FIG. 5 is a flowchart of an embodiment of OA&M E-LAN service configuration method 500. The OA&M E-LAN service configuration method 500 may be implemented in any network that may support logical E-LAN services, such as Ethernet based networks, VPLS supported networks, or other networks. The OA&M E-LAN service configuration method may be implemented at layer 2 using a default E-LAN service, e.g. in an automatic manner by the nodes in the network without operator intervention.

The method 500 may begin at block 510, where an E-LAN SID for an OA&M port may be advertised on an E-LAN. For example, the OA&M ports of a plurality of nodes may advertise their SID (e.g. SID#0) that corresponds to a default E-LAN service (e.g. E-LAN#0) for OA&M. The E-LAN services in the network may also be signaled to the nodes, e.g. using MPLS. In an embodiment, the nodes may advertise the SID using intermediate system to intermediate system (IS-IS) protocol, label distribution protocol (LDP), border gateway protocol (BGP), open shortest path first (OSPF), or other protocols. The OA&M ports associated with the SID#0 may receive the SID advertisements sent from the other ports. At block 520, the E-LAN service that corresponds to the SID may be joined. For instance, the nodes may learn and compute a multicast E-LAN, e.g. based on the 802.1aq standard, to reach the OA&M ports associated with the SID. Each of the nodes may join the default service for the SID#0 and thus connect to the other nodes via the logical Ethernet service.

At block 530, an IP address request may be sent on the E-LAN service, e.g. in a periodic or repeated manner. For example, after joining the default E-LAN service, the nodes may send DHCP requests for OA&M IP addresses from their OA&M ports on the default E-LAN service. At block 540, an OA&M IP address assigned for OA&M communications may be received over the E-LAN service. As such, the OA&M ports of the nodes may be assigned IP address for accessing the OA&M network. In another embodiment, the OA&M ports of the nodes may be assigned IP addresses without sending an IP address request, e.g. in a proactive manner upon detecting the connections to the nodes. Accordingly, block 530 may be omitted from the method 500. At block 550, the OA&M IP addresses may be used to bridge packets on the OA&M E-LAN Service. The nodes may bridge packets (e.g. OA&M traffic) on their OA&M ports to the OA&M E-LAN service that corresponds to the SID, e.g. using the logical E-LAN service connections between the nodes. The method 500 may then end.

Figure 6:
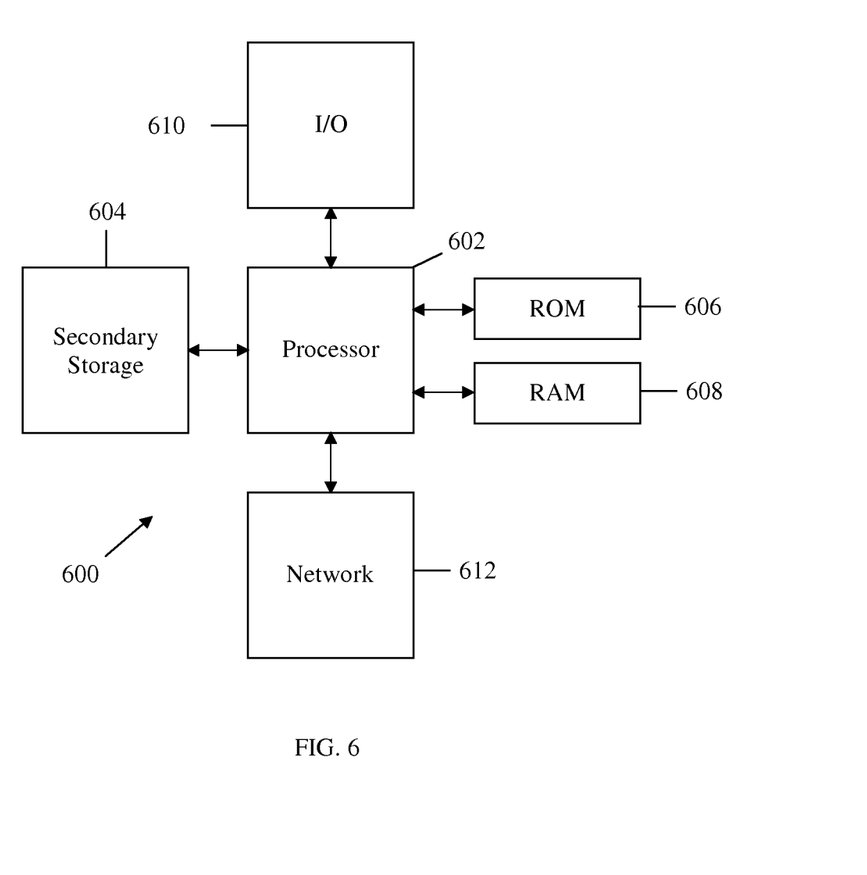
FIG. 6 is a schematic diagram of an embodiment of a general-purpose network component.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system comprising:
a plurality of nodes coupled to each other and configured to dynamically create a plurality of Ethernet-Local Area Network (E-LAN) services at Open System Interconnection (OSI) layer 2 without assistance from an operations, administration, and maintenance (OA&M) server;
a second node configured to join a default E-LAN, wherein the second node is a type of node capable of joining the default E-LAN participated by the nodes, wherein the nodes on the default E-LAN services compute routes to reach the second node,
wherein the default E-LAN service is reserved amongst the plurality of E-LAN services for an OA&M network,
wherein each of the nodes join the default E-LAN service without assistance from a network management node,
wherein the OA&M server is coupled to a first node of the nodes via a port,
wherein the nodes and the OA&M server exchange OA&M traffic over the default E-LAN service,
wherein the nodes join the default E-LAN service without operator intervention,
wherein the default E-LAN indicated by an E-LAN service identifier number is provided to the nodes prior to participating in the default E-LAN,
wherein first node is a OA&M attachment point for the E-LAN,
wherein the nodes are not directly reachable by the OA&M server except for the first node,
wherein the OA&M traffic is routed to each node using an assigned OA&M IP address,
wherein each node joins the default E-LAN by advertising membership to the default E-LAN, and
wherein the second node comprises a memory device and a processor.

2. The system of claim 1, wherein the OA&M traffic is forwarded on a logical Internet Protocol (IP) subnet using the default E-LAN service.

3. The system of claim 1, wherein the E-LAN service identifier number is assigned at the OSI layer 2.

4. The system of claim 1, wherein the E-LAN service identifier number is not assigned using Internet Protocol (IP) address.

5. The system of claim 1, wherein the default E-LAN service is an Institute of Electrical and Electronics Engineers (IEEE) 802.1aq network service, and wherein the default E-LAN service is not created using IP routing functionality or protocols.

6. The system of claim 1, wherein the E-LAN service is a Virtual Private Local Area Network Service (VPLS).

7. The system of claim 1, wherein the E-LAN connectivity is provided by an Internet Engineering Task Force (IETF) TRansparent Interconnection of Lots of Links (TRILL) network, and wherein each node computes a data path to reach the OA&M server when joining the default E-LAN.

8. The system of claim 1, wherein each node comprises:
an OA&M stack in communications with the OA&M server, and
an OA&M port coupled to the OA&M stack and to remaining nodes via a logical E-LAN.

9. A network component comprising:
a non-transitory memory; and
a processor coupled to the non-transitory memory, wherein the non-transitory memory includes instructions that when executed by the processor cause the network component to perform the following:

advertise an Ethernet-Local Area Network (E-LAN) service identifier (SID) for an operations, administration, and maintenance (OA&M) port of an OA&M server on an E-LAN service, wherein the E-LAN SID is assigned using Open System Interconnection (OSI) layer 2;

join an E-LAN service without operator intervention that corresponds to the E-LAN SID, wherein the E-LAN SID is extracted from an advertising frame that advertises the membership of the E-LAN service; and     receive an OA&M Internet Protocol (IP) address assigned for OA&M communications over the E-LAN service subsequent to joining the E-LAN service;

bridge OA&M traffic on the E-LAN service using the OA&M IP address; and     compute a plurality of routes to reach the OA&M port and one or more nodes joined to the E-LAN service,     wherein the network component is a type of node capable of joining the E-LAN service participated by the nodes,     wherein network component receives the E-LAN SID prior to participating in the E-LAN service, and     wherein the network component is not directly reachable by the OA&M server except via an OA&M attachment point for the E-LAN service.

10. The network component of claim 9, wherein the E-LAN SID is advertised using intermediate system to intermediate system (IS-IS) protocol, and wherein the processor is further configured to compute a multicast E-LAN to reach the OA&M port.

11. The network component of claim 9, wherein the instructions, when executed by the processor, cause the network component to send an IP address request on the E-LAN service.

12. The network component of claim 11, wherein the IP address request is sent using Dynamic Host Configuration Protocol (DHCP).

13. The network component of claim 9, wherein the OA&M traffic is transported an Institute of Electrical and Electronics Engineers (IEEE) 802.ah path.

14. The network component of claim 9, wherein the E-LAN service is signaled using multi-protocol label switching (MPLS).

15. A method comprising:

establishing a default Ethernet-Local Area Network (E-LAN) service for an operations, administration, and maintenance (OA&M) network, wherein the default E-LAN service is created without using Internet Protocol (IP) routing functionality or protocols and without coordinating with an OA&M server;

allowing an un-joined network device to join the default E-LAN service automatically using an E-LAN service identifier, wherein the E-LAN service identifier is not assigned using an Internet Protocol (IP) address;

computing one or more data paths for the default E-LAN service, wherein all network devices on the default E-LAN service compute routes to reach the un-joined network device when the un-joined network device joins the default E-LAN service; and     exchanging OA&M communications with the OA&M network over the default E-LAN service, wherein the un-joined network device acquires an OA&M IP address over the default E-LAN service,     wherein the un-joined network device joins the default E-LAN service without operator intervention,     wherein the E-LAN service identifier is provided prior to joining the default E-LAN service,     wherein one of the network devices on the default E-LAN service is an OA&M attachment point for the E-LAN service identifier,     wherein the un-joined network device is not directly reachable by the OA&M server except for the one of the network device,     wherein OA&M traffic within the OA&M network is routed to the un-joined network device using an assigned OA&M IP address, and     wherein the un-joined network device joins the default E-LAN service by advertising membership to the default E-LAN service.

16. The method of claim 15, wherein the OA&M communications comprise a Telenet session, Hypertext Transfer Protocol (HTTP) session, or both, and wherein the new network device advertises the default service identifier to join the default E-LAN service.

17. The method of claim 15, wherein a service identifier (SID) for the default E-LAN service and the OA&M communications are exchanged via Network-to-Network interface (NNI) connections.

18. The method of claim 15, wherein the default E-LAN service is subject to a Service Level Agreement (SLA), a Quality of Service (QoS), or both.

\* \* \* \* \*